United States Patent [19]

Fedor

[11] 4,111,849

[45] Sep. 5, 1978

[54] LOW COPPER $NO_x$ REDUCTION CATALYST

[75] Inventor: Robert J. Fedor, Westlake, Ohio

[73] Assignee: Gould Inc., Rolling Meadows, Ill.

[21] Appl. No.: 305,738

[22] Filed: Nov. 13, 1972

Related U.S. Application Data

[63] Continuation-in-part of Ser. No. 249,884, May 3, 1972, abandoned.

[51] Int. Cl.$^2$ .......................... B01J 23/72; B01J 23/76
[52] U.S. Cl. ................................ 252/474; 252/477 R; 423/213.5
[58] Field of Search .......................... 252/474, 477 R; 423/213.2, 213.7, 213.5

[56] References Cited

U.S. PATENT DOCUMENTS

| | | | |
|---|---|---|---|
| 3,119,879 | 1/1964 | Hort et al. | 252/474 X |
| 3,565,574 | 2/1971 | Kearby et al. | 252/474 X |
| 3,718,733 | 2/1973 | Gehri | 423/213.2 |
| 3,773,894 | 11/1973 | Bernstein et al. | 252/474 X |

*Primary Examiner*—W. J. Shine
*Attorney, Agent, or Firm*—Russell E. Baumann; Edward E. Sachs

[57] ABSTRACT

A durable catalytic structure capable of catalyzing the reduction of $NO_x$ gases found in the exhaust stream emanating from an internal combustion engine substantially without the generation of ammonia is provided which comprises a heat resistant metallic substrate having adhering to at least a part of the surface thereof a catalytic alloy of a nickel base material and copper with the weight ratio of the nickel base material to copper being at least equal to, but preferably greater than, about 9 to 1.

9 Claims, 3 Drawing Figures

LOW COPPER $NO_x$ REDUCTION CATALYST

This application is a continuation-in-part of U.S. patent application Ser. No. 249,884, filed May 3, 1972 now abandoned.

BACKGROUND OF THE INVENTION

1. Field of the Invention

This invention relates to an improved catalytic structure which is especially well suited for use as a means of catalytically reducing oxides of nitrogen, specifically nitric oxide and nitrogen dioxide (herein collectively referred to as $NO_x$), which are found in the exhaust gases emanating from an internal combustion engine. In particular, the instant invention concerns an extremely durable catalytic structure which is capable of catalytically reducing $NO_x$ in a hydrogen and/or hydrocarbon atmosphere substantially without the generation of ammonia which comprises an expanded, heat resistant metallic substrate having deposited on the surface thereof an alloy of a nickel base material and copper with the weight ratio of the nickel base material to copper being at least equal to, but preferably greater than, about 9 to 1.

2. Description of the Prior Art

Many undesirable gases are found in the exhaust stream emanating from the internal combustion engine. Some of the most harmful and annoying of these gases are carbon monoxide, unburned hydrocarbons and the various oxides of nitrogen.

Presently, much effort is being directed toward the removal of carbon monoxide and unburned hydrocarbons by thermal or catalytic oxidation and to the diminution or elimination of the oxides of nitrogen by catalytically induced reduction. Specifically, with regard to the various oxides of nitrogen, the present desire is to eliminate at least 90 percent of the $NO_x$ found in the exhaust gases issuing from the typical internal combustion engine, using the 1971 U.S.A. automotive vehicle as the base.

To date, various catalysts have been suggested as a means of catalytically reducing $NO_x$ to less harmful substances. For example, in U.S. Pat. No. 3,565,574 it is suggested that metals or alloys of metals chosen from the metals set forth in Groups I-B and IV to VIII of the periodic system are suitable catalysts for the catalytic reduction of $NO_x$. It is particularly pointed out therein that a Monel type alloy containing 66 weight percent nickel and 31.5 weight percent copper, plus 2.5 weight percent impurities is a very effective catalyst for the reduction of $NO_x$ gases found in exhaust gases emanating from an internal combustion engine, especially when operating at temperatures in excess of 1200° F.

While catalysts of the foregoing type have been generally effective as a means of catalytically reducing $NO_x$, it has now been discovered that certain catalysts of the Monel type, i.e., those which contain a high weight percentage of copper, suffer from the disadvantage that in a hydrogen and/or hydrocarbon containing atmosphere a significant amount of the nitrogen component of the $NO_x$ is reacted with hydrogen to form ammonia. Accordingly, when such a $NO_x$ catalyst is used in a catalyst system wherein the exhaust gases are first brought into contact with a reduction catalyst and then into contact with a separate oxidation catalyst (that is, in a dual catalyst system), the ammonia generated by means of the reduction catalyst is then oxidized by means of the oxidation catalyst to reform undesirable $NO_x$ gases.

In summary, it can be said that the prior art has provided nickel-copper, Monel type catalysts which are capable of catalytically reducing $NO_x$ but it has failed to provide a catalyst which consists essentially of a nickel base material and copper having a high degree of durability which when used in a hydrogen and/or hydrocarbon containing atmosphere does not produce a significant amount of ammonia.

SUMMARY OF THE INVENTION

Very briefly, the present invention concerns a durable catalyst which is especially well suited for use in catalyzing the reduction of $NO_x$ gases to more desirable substances in a hydrogen and/or hydrocarbon containing atmosphere without the production of significant amounts of ammonia which comprises an alloy of a nickel base material and copper wherein the weight ratio of the nickel base material to copper is at least equal to, but preferredly greater than, 9 to 1.

As used herein and in the appended claims, the term "nickel base material" means essentially pure nickel or nickel which contains minor amounts of other elements which function in a manner similar to nickel when used as a $NO_x$ reducing catalyst, for example, amounts of up to about 1.5 weight percent cobalt (based on the amount of the nickel present).

In the preferred practice of the invention, a catalytic structure is provided which comprises a heat resistant metallic substrate in the form of a thin sheet of expanded metal having adherently deposited on the surface thereof an alloy of a nickel base material and copper wherein the weight ratio of the nickel base material to copper is at least equal to, but preferredly greater than, about 9 to 1.

The catalyst of the invention is especially useful when it is utilized in a dual catalyst system, that is, a system in which two separate catalysts are employed, one to reduce $NO_x$ and the other to oxidize carbon monoxide and the various hydrocarbons which may be present. Accordingly, in a dual catalyst system when it is desired to have a net reduction in the $NO_x$ content of the exhaust gas of at least 90 percent, it becomes essential that a $NO_x$ reducing catalyst be used which produces little, if any, ammonia. By utilizing the teachings of the instant invention, it is now possible to fabricate a durable catalytic structure which can be used in a hydrogen and/or hydrocarbon containing atmosphere to catalytically reduce $NO_x$ without the production of a significant amount of ammonia.

It is, therefore, the primary object of the instant invention to provide a durable catalytic structure which exhibits a high degree of catalytic activity and is also characterized by the fact that it does not produce a significant amount of ammonia when used to catalytically reduce a $NO_x$ gases found in the exhaust stream emanating from the internal combustion engine.

Other objects and the means of accomplishing them will be apparent to those skilled in the art from a reading of the following description and claims.

BRIEF DESCRIPTION OF THE DRAWINGS

In FIGS. 1, 2 and 3, like parts are indicated by like numerals. Specifically, in FIG. 1, there is shown an expanded metal foil catalytic structure 10 comprised of a plurality of connected metal strands 12 which define openings 14; in FIG. 2, the strands 12 and openings 14 defined thereby are shown in an enlarged manner; and in FIG. 3 a cross-sectional view of the strands 12 is shown. In addition, it can be seen from FIG. 3 that the respective surfaces of the strands 12 lie in a plane or planes which are angular with respect to the plane of the sheet of unexpanded metal foil.

DESCRIPTION OF THE PREFERRED EMBODIMENTS OF THE INVENTION

Figure 1:
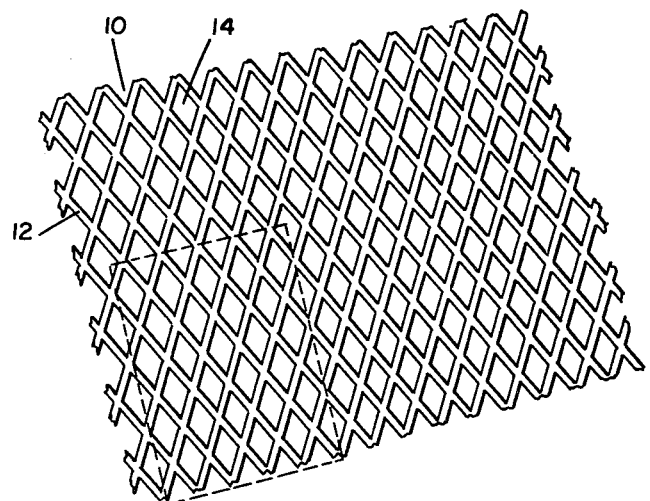
FIG. 1 is a plan view of a $NO_x$ reducing catalytic structure, in the form of a sheet of expanded metal foil, which was produced according to the teachings of the instant invention.
Figure 2:
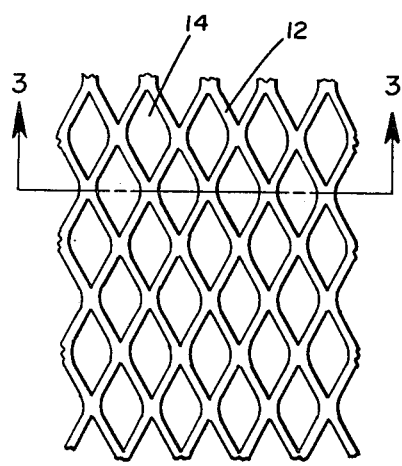
FIG. 2 is an enlarged plan view of the rectangular area shown in FIG. 1.
Figure 3:
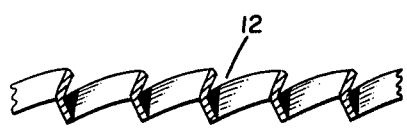
FIG. 3 is a cross-sectional view taken along line 3—3 of FIG. 2 of the catalytic structure shown in FIG. 1.

The preferred embodiment of the invention concerns a durable, low copper emission control catalyst which is capable of catalytically reducing $NO_x$ in a hydrogen and/or hydrocarbon containing atmosphere substantially without the generation of ammonia which comprises an expanded heat resistant metallic substrate having adherently applied to its surface an alloy of a nickel base material and copper with the weight ratio of the nickel base material to copper being at least equal to, but preferably greater than about, 9 to 1.

In the preferred practice of the invention, the desired catalytic structure is fabricated by obtaining a thin sheet of heat resistant metal foil, expanded the sheet of metal foil to produce an expanded metal structure and then adherently applying the herein described catalyst to the surface of the expanded metal structure.

The starting metal foil is preferably fabricated from either a nickel, cobalt or iron base composition which is rendered corrosion resistant by alloying it with such metals as chromium and/or aluminum, as desired. By the term "base composition" is meant that the amount or weight percent of one metal selected from the group consisting of nickel, cobalt and iron always exceeds the individual amount or weight percent of any other metal from this group which might also be present. More specifically, alloy compositions which are preferred for use in forming the catalyst substrate employed in the practice of the instant invention are those which contain major amounts of a metal selected from the group consisting of iron, cobalt and nickel together with minor amounts of chromium and, if desired, aluminum and chromium plus incidental impurities. The exact alloy composition which is to be employed in fabricating a particular sheet of metal foil or substrate depends to a great degree on the type of automotive exhaust environment in which the resultant catalytic structure is to be utilized. The rendering of the base composition resistant to corrosion can be accomplished in a number of ways. For example, the base composition can be prealloyed with chromium or aluminum and chromium and then the expanded substrate formed, or the base composition can be formed into an expanded structure which is then alloyed with chromium or chromium and aluminum.

The metal foil to be used in the preferred practice of the instant invention can be produced by various well known metal forming techniques. For example, it can be produced by electrodeposition, by hot or cold working ingots or other cast forms of the desired alloy to form a sheet of wrought metal foil, or it can be produced by powder metallurgy techniques, i.e., by bonding metal powders together, with or without binders, followed by simultaneous or subsequent heating to produce a coalesced, sintered metal or alloy. As all of the foregoing techniques for forming sheets of thin metal foil are well known in the art, for the sake of brevity, they will not be discussed herein in great detail.

In the preferred embodiment of the invention, the thin metal foil usually has a thickness of about 0.01 inch or less. In the actual practice it has been found most desirable to employ thin metal foil having a thickness ranging from about 0.002 inch to about 0.006 inch. However, the exact thickness to be employed depends on such variables as the type of metal or alloy used as the substrate, the type of automotive exhaust environment the resultant catalytic structure will actually experience and the specific $NO_x$ catalyst utilized, together with other factors.

The metal foil used in the practice can be expanded by a variety of well known techniques. For example, it is possible to expand the metal foil by appropriately slitting the metal foil and concurrently or subsequently stretching it by the application of a suitable force. An expanding technique which has been found to be especially suitable for forming the type of thin metal foil used in the practice of the instant invention is one wherein a solid sheet of metal foil is fed over the edge of the bed of an expanding machine and a serrated knife blade slits and stretches a thin section of the edge of the metal sheet to thereby form a plurality of V-shaped metal strands. The knife then moves up again and slides over in a given direction half the length of initial individual V-shaped strands while the sheet of metal foil is advanced on the machine bed in a controlled manner. The knife then descends for another slitting and stretching operation. Subsequently, the knife blade is retracted and the foregoing series of steps is repeated until a suitable expanded metal structure is obtained. In this type of expanding operation, the individual strands which make up the resultant expanded metal structure are turned or distorted such that the plane of their surface is now at an angle with respect to the plane of the surface of the original unexpanded foil sheet. From test data obtained to date, it has been observed that supported $NO_x$ reducing catalysts formed from a substrate of the type hereinbefore described exhibit excellent $NO_x$ reducing qualities.

The catalyst which is applied to the heat resistant metallic substrate comprises an alloy of nickel base material and copper wherein the weight ratio of the nickel base material to copper is at least equal to, but preferably greater than, about 9 to 1, and, most preferably about 49 to 1. Normally, these catalytic materials are adherently applied to or coated on the thin expanded metal foil substrate in such a manner that little, if any, of the catalytic material migrates into the expanded metal foil substrate. In practice, the catalyst material is preferentially electrodeposited on the thin metal foil substrate and then subsequently diffusion bonded thereto. During the diffusion bonding procedure care must be taken to (1) make sure that the catalyst material is sufficiently affixed to the substrate so that it does not fall off in use, and (2) to prevent the various components of the substrate, such as chromium, from migrating to the surface of the catalyst as some of these materials are themselves catalysts which encourage the formation of ammonia.

In the preferred practice of the invention the nickel base material is essentially all nickel. However, from a practical standpoint, when one attempts to coat a substrate with commercially pure nickel, which often contains up to about 1.5 weight percent cobalt, a coating containing minor amounts of cobalt is usually obtained. From a $NO_x$ catalyst standpoint this deposition of cobalt presents no significant problems as the concerned chemical and physical properties of cobalt are quite similar to those of nickel.

In the situation where the $NO_x$ reduction catalyst of the invention has been formed by alloying commercially pure nickel (e.g., nickel containing up to about 1.5 percent cobalt) and copper, on a percentage basis, the catalytic alloy can consist essentially of from about 88.6 to about 99.9 weight percent nickel, from about 0.1 to about 10 weight percent copper, and from trace amounts (i.e., minor but detectable amounts) to about 1.4 weight percent cobalt with the amount of cobalt not exceeding about 1.5 percent of the amount of nickel present.

From the foregoing it is noted that on a weight ratio basis the ratio of nickel plus cobalt (i.e., of the nickel base material) to copper is about 9 to 1, or higher.

In addition to the foregoing technique, the catalyst material can be applied to the thin metal foil substrate by such techniques as vapor deposition, flame spraying, slip casting and dry powder sintering. The exact method of coating the substrate with the $NO_x$ reducing catalyst is not critical.

Also, it should be noted here that it may be possible to incorporate other materials in the catalyst composition of the invention without losing the benefits of the instant invention, provided the weight ratio of the nickel base material to copper is maintained at about 9 to 1, or higher. However, when the $NO_x$ reducing catalyst used in the practice of the invention consists essentially of pure nickel and copper, the resultant catalytic alloy should contain from a trace amount, i.e., preferrably about 0.1 weight percent to about 10 weight percent copper, with the balance being nickel plus incidental impurities.

In its preferred form, the $NO_x$ reducing catalytic alloy of the invention consists essentially of from about 1 weight percent to about 2 weight percent copper, with the balance being essentially nickel base material plus incidental inpurities.

It should be noted here that while nickel is an excellent $NO_x$ reducing catalyst it suffers from the fact that (1) when it is used in an oxygen containing atmosphere, its effectiveness decreases with an increase in the amount of oxygen present and (2) when it is exposed to a highly oxidizing environment and subsequently exposed to a reducing atmosphere, it requires a significant time lapse of as much as 30 seconds to resume its ability to function as a $NO_x$ reducing catalyst.

These handicaps are substantially overcome by alloying the nickel catalyst with copper. Accordingly, the exact amount of copper required in the catalytic structure of the invention is the amount necessary to cause the nickel catalyst to function properly in an oxygen containing (but reducing) atmosphere and to resume its $NO_x$ reducing function in a matter of a few fractions of a second after it has been exposed to a highly oxidizing atmosphere and then subjected to a reducing environment. However, the exact amount of copper required to achieve the foregoing objectives is not yet known with mathematical certainty. Stating it functionally, an effective amount of copper is that amount which is required to cause the nickel catalyst material to operate satisfactorily in a reducing atmosphere which contains minor amounts of oxygen and to recover its $NO_x$ reducing ability rapidly when subjected to a reducing atmosphere after having been exposed to a highly oxidizing environment. It is believed that a minimum effective amount of copper for the foregoing purpose can range from about 0.1 to about 1.0 weight percent of the catalytic alloy (i.e., nickel base material plus copper alloy), with it being preferred to employ at least about 1.0 weight percent copper to avoid loss of effectiveness due to such problems as diffusion into the substrate and the like.

Accordingly, when it is desired to minimize the before described problems, the catalytic structure of the invention should comprise a heat resistant metallic substrate having a $NO_x$ reducing catalyst adherently deposited on at least a part of the surface thereof which comprises an alloy of a nickel base material and copper wherein the weight ratio of nickel base material to copper ranges from about 9 to 1 to about 99 to 1. Therefore, the $NO_x$ reducing catalytic alloy employed in the practice of the invention should preferably contain at least 1.0 weight percent copper, based on the total amount of nickel base material plus copper. That is, the catalytic alloy should preferably not have a nickel base material to copper ratio greater than about 99 to 1.

The instant invention can be better understood by reference to the following examples which are set forth herein for illustrative purposes only and are not intended to limit the scope of the instant invention.

EXAMPLE 1

A durable low copper $NO_x$ reduction catalyst capable of catalytically reducing the $NO_x$ component of exhaust gases emanating from the internal combustion engine is produced as follows:

(a) A sheet of electrodeposited nickel foil about 15 feet long by about 4 inches wide by about 0.002 inches thick is obtained.

(b) This sheet of nickel foil is then electroplated with chromium until a weight increase of about 20 percent is achieved.

(c) The chromium is then alloyed with the nickel foil by heating the so-coated sheet of metal foil at a temperature of about 2200° F for a period of about 2 hours under sub-atmospheric conditions (at a pressure of about ½ an atmosphere of argon). The composition of the resultant metal foil substrate is about 80 weight percent nickel (which includes about 1 weight percent cobalt) and about 20 weight percent chromium.

(d) This sheet of nickel foil is then expanded by use of a conventional expanding apparatus so that the resultant expanded metal structure has a strand width of about 0.015 inches and contains about 5 diamond-shaped openings per inch of width.

(e) The complete surface of the so-produced expanded nickel-chromium substrate is then electroplated with commercially pure nickel to provide a coating of a nickel base material (containing about 1.1 weight percent cobalt) having a thickness of about 0.0009 inch. Subsequently, a coating of copper about 0.0001 inch thick is electrolytically overplated on the substrate having the nickel base material deposited thereon. The copper and nickel base material are then alloyed together and diffusion bonded to the substrate by heating the so-coated article to a temperature of about 1900° F for a period of about 2 hours at sub-atmospheric pressures (½ atmosphere of argon). The resultant catalyst was an alloy of nickel base material and copper having a nickel base material to copper weight ratio of about 9 to 1. On a percentage by weight basis the catalyst alloy consisted essentially of about 88.9 percent nickel, about 1.1 percent cobalt and about 10.0 percent copper.

EXAMPLE 2

A durable low copper $NO_x$ reduction catalyst capable of catalytically reducing the $NO_x$ component of exhaust gases emanating from an internal combustion engine is produced as follows:

(a) A sheet of wrought foil about 15 feet long and 4 inches wide having a thickness of about 0.002 inch consisting of about 80 weight percent nickel and about 20 weight percent chromium is obtained.

(b) The sheet of wrought foil is then expanded by the techniques described in Example 1.

(c) The complete surface of the so-produced expanded nickel base substrate is then electroplated with chemically pure nickel to provide a coating having a thickness of about 0.0009 inches. Subsequently, a coating of copper about 0.001 inch thick is electrolytically overplated on the nickel coated substrate. The copper and nickel are then alloyed together and diffusion bonded to the substrate by heating the so-coated article to a temperature of about 1900° F for a period of about 2 hours at sub-atmospheric pressures (½ atmosphere of argon). The resultant catalyst was a nickel-copper alloy having a nickel to copper ratio of about 9 to 1. On a percentage by weight basis, the catalytic alloy consisted essentially of about 90 percent nickel and 10 percent copper.

EXAMPLE 3

A durable low copper $NO_x$ reduction catalyst capable of catalytically reducing the $NO_x$ component of exhaust gases emanating from an internal combustion engine is produced as follows:

(a) A sheet of wrought foil about 15 feet long and 4 inches wide having a thickness of about 0.002 inches consisting of about 80 weight percent nickel and 20 weight percent chromium is obtained.

(b) The sheet of wrought foil is then expanded by the technique described in Example 1.

(c) The sheet of expanded metal foil is submerged in a plating bath containing 200 g/l of nickel sulfate hexahydrate, 15 g/l nickel chloride hexahydrate, 75 g/l sodium citrate and 1.5 g/l of copper sulfate pentahydrate. The pH of the plating bath is regulated so that it ranged from about 4.5 to about 5, while the temperature of the plating bath is controlled so that it ranges from about 50° to about 60° C. The sheet of expanded metal foil is the cathode and the anode is a rectangular body of commercially pure nickel (containing about 1 weight percent cobalt). A plating current of about 50 amperes/square foot was employed. A coating about 0.2 to about 0.3 mils thick consisting of about 98 weight percent nickel base material and about 2 weight percent copper is obtained in about 5 to 6 minutes.

(d) The nickel base material-copper coating is then diffusion bonded to the substrate by heating the so-coated article to a temperature of about 1900° F for a period of about 2 hours at sub-atmospheric pressures (½ atmosphere of argon). The resultant catalyst was an alloy consisting of essentially a nickel base material and copper having a nickel base material to copper ratio of about 49 to 1. On a percentage by weight basis, the catalytic alloy consisted essentially of about 97 weight percent nickel, about 1 percent cobalt and about 2 percent copper.

While the foregoing examples illustrate certain preferred catalyst compositions, the following table sets forth the specific catalyst compositions of the invention which should be utilized to avoid the generation of undesirable amounts of ammonia when catalytically reducing $NO_x$ gases found in the exhaust stream emanating from an internal combustion engine.

TABLE

| Catalyst Composition (in weight percent) | Oxygen Content of Exhaust Gas | Gross Conversion of $NO_x$ (percent) | Amount of Ammonia Produced (percent) |
|---|---|---|---|
| 80 Ni base material - 20 Cu | 0.0 | 99.9 | 38.0 |
| 80 Ni base material - 20 Cu | 0.5 | 99.9 | 8.0 |
| 80 Ni base material - 20 Cu | 1.0 | 98.4 | — |
| 90 Ni base material - 10 Cu | 0.0 | 99.7 | 5.4 |
| 90 Ni base material - 10 Cu | 0.5 | 99.5 | 2.4 |
| 90 Ni base material - 10 Cu | 1.0 | 98.0 | — |
| 98 Ni base material - 2 Cu | 0.0 | 99.9 | 1.9 |
| 98 Ni base material - 2 Cu | 0.5 | 99.9 | — |
| 98 Ni base material - 2 Cu | 1.0 | 99.9 | — |

Note: (1) Exhaust Gas Composition
    1.6 percent CO
    .5 percent $H_2$
    12.0 percent $CO_2$
    1500 ppm $NO_x$
    500 ppm hydrocarbons as $nC_6$
    (as noted above) percent $O_2$
    balance percent $N_2$
(2) Test Condition
(a) Temperature - about 1200° F
(b) Physical catalyst arrangement - 30, 1" diameter discs
(c) Gas space velocity - 100,000V/V/Hr.

From a review of the foregoing table, it is noted that $NO_x$ reducing caetalysts formed from an alloy of a nickel base material and copper having a nickel base material to copper ratio of at least about 9 to 1 and higher do not produce a significant amount of ammonia. Accordingly, when such catalysts are used in a dual catalyst system there is less than 10 percent ammonia generated so that if all the generated ammonia is converted back to $NO_x$ the resultant exhaust emanating from the dual catalyst system still meets the $NO_x$ diminution standards set by the U.S. Government for 1976.

Catalytic structures of the type herein described can be formed into various shapes and configurations. In actual practice, it has been determined that a highly efficient $NO_x$ reducing catalytic assembly can be obtained by forming a $NO_x$ reducing catalytic structure in sheet form, as described in the foregoing examples, and then fashioning this catalytic structure into a compacted mass, such as a helical coil, which, in turn, is then inserted into a suitable container through which $NO_x$ containing gases can be directed.

In the foregoing specification, only major constituents of the catalytic structure of the present invention have been discussed in detail. Accordingly, it will be readily appreciated by those skilled in the art that various minor constituents may also be present which do not interfere with the practice of the instant invention without departing from its spirit and scope.

What is claimed is:

1. A durable catalytic structure capable of catalyzing the reduction of $NO_x$ gases found in the exhaust stream emanating from an internal combustion engine without the generation of undesirable amounts of ammonia comprising a heat resistant metallic substrate having a catalytic alloy of essentially pure nickel base material and copper adherently deposited on at least a part of the surface thereof wherein the weight ratio of the nickel in the nickel base material to copper is about 49 to 1.

2. The catalytic structure of claim 1 wherein the catalytic alloy of a nickel base material and copper consists essentially of about 2 weight percent copper with the balance being nickel plus incidental impurities.

3. The catalytic structure of claim 1 wherein said catalytic alloy of a nickel base material and copper consists essentially of about 2 weight percent copper and about 98 weight percent nickel.

4. The catalytic structure of claim 1 wherein said heat resistant metallic substrate is fashioned from an alloy selected from the group consisting of nickel base alloys, cobalt base alloys and iron base alloys.

5. The catalytic structure of claim 1 wherein said heat resistant metallic substrate is in the form of a sheet of expanded metal foil having a plurality of strands defining openings therebetween.

6. The catalytic structure of claim 5 wherein the surface planes of said strands are angular with respect to the plane of the surface of the metal from which said strands are formed.

7. The catalytic structure of claim 1 wherein said nickel base material and said copper are deposited on said substrate by electroplating.

8. The catalytic structure of claim 6 wherein said nickel base material and said copper are deposited on said substrate by electroplating.

9. The catalytic structure of claim 8 wherein said expanded metal foil comprises a nickel-chromium alloy having a thickness less than about 0.01 in.

* * * * *